United States Patent
Liu et al.

(10) Patent No.: US 8,335,049 B1
(45) Date of Patent: Dec. 18, 2012

(54) DISK DRIVE DETECTING CRACK IN MICROACTUATOR

(75) Inventors: Yanning Liu, San Ramon, CA (US); Chuanwen Ji, Irvine, CA (US); Nathan J. Santee, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 326 days.

(21) Appl. No.: 12/794,891

(22) Filed: Jun. 7, 2010

(51) Int. Cl.
    *G11B 5/596* (2006.01)
(52) U.S. Cl. .................................................. 360/78.05
(58) Field of Classification Search .................. None
    See application file for complete search history.

(56) References Cited

U.S. PATENT DOCUMENTS

| | | | |
|---|---|---|---|
| 2,728,222 A | 12/1955 | Becker et al. | |
| 4,760,358 A | 7/1988 | Inoue | |
| 5,118,982 A | 6/1992 | Inoue et al. | |
| 5,262,643 A | 11/1993 | Hammond et al. | |
| 5,301,558 A | 4/1994 | Livingston et al. | |
| RE37,030 E | 1/2001 | Lloyd et al. | |
| 6,249,890 B1 | 6/2001 | Ukani et al. | |
| 6,510,752 B1 | 1/2003 | Sacks et al. | |
| 6,556,028 B1 * | 4/2003 | Umanskiy et al. | 324/727 |
| 6,639,411 B1 | 10/2003 | Thomsen | |
| 6,831,807 B2 * | 12/2004 | Koso et al. | 360/78.05 |
| 6,861,854 B1 | 3/2005 | Guo et al. | |
| 6,870,377 B2 | 3/2005 | Thomsen | |
| 6,975,477 B1 * | 12/2005 | Hu et al. | 360/78.05 |
| 6,977,793 B2 | 12/2005 | White et al. | |
| 7,009,804 B2 | 3/2006 | Sharma et al. | |
| 7,072,134 B1 * | 7/2006 | Hirano et al. | 360/55 |
| 7,075,748 B2 | 7/2006 | White et al. | |
| 7,079,338 B1 | 7/2006 | Semba et al. | |
| 7,079,339 B1 * | 7/2006 | Semba et al. | 360/31 |
| 7,106,552 B2 | 9/2006 | Hirano et al. | |
| 7,124,654 B1 | 10/2006 | Davies et al. | |
| 7,336,434 B2 | 2/2008 | Lille et al. | |
| 7,423,837 B2 | 9/2008 | Hutsell | |
| 7,768,276 B2 * | 8/2010 | Yao | 324/727 |
| 2003/0076121 A1 * | 4/2003 | Guo et al. | 324/727 |
| 2009/0303839 A1 | 12/2009 | Narayanan et al. | |
| 2010/0037674 A1 | 2/2010 | Yashchuk et al. | |

FOREIGN PATENT DOCUMENTS

| | | |
|---|---|---|
| UA | 20940 | 2/2007 |
| UA | 20943 | 2/2007 |
| WO | WO2009128546 | 10/2009 |

* cited by examiner

*Primary Examiner* — Hoa T Nguyen
*Assistant Examiner* — James L Habermehl

(57) ABSTRACT

A disk drive is disclosed comprising a first disk surface, a first head coupled to a distal end of an actuator arm, and a voice coil motor (VCM) and a first microactuator operable to actuate the first head over the first disk surface. A servo loop for servoing the head in response to the servo sectors is disabled, and after disabling the servo loop, the first microactuator is excited with a control signal at a test frequency in order to accentuate a crack in the first microactuator. After exciting the first microactuator, the servo loop is enabled, and after enabling the servo loop, the first microactuator is evaluated to detect the crack in the first microactuator.

24 Claims, 10 Drawing Sheets

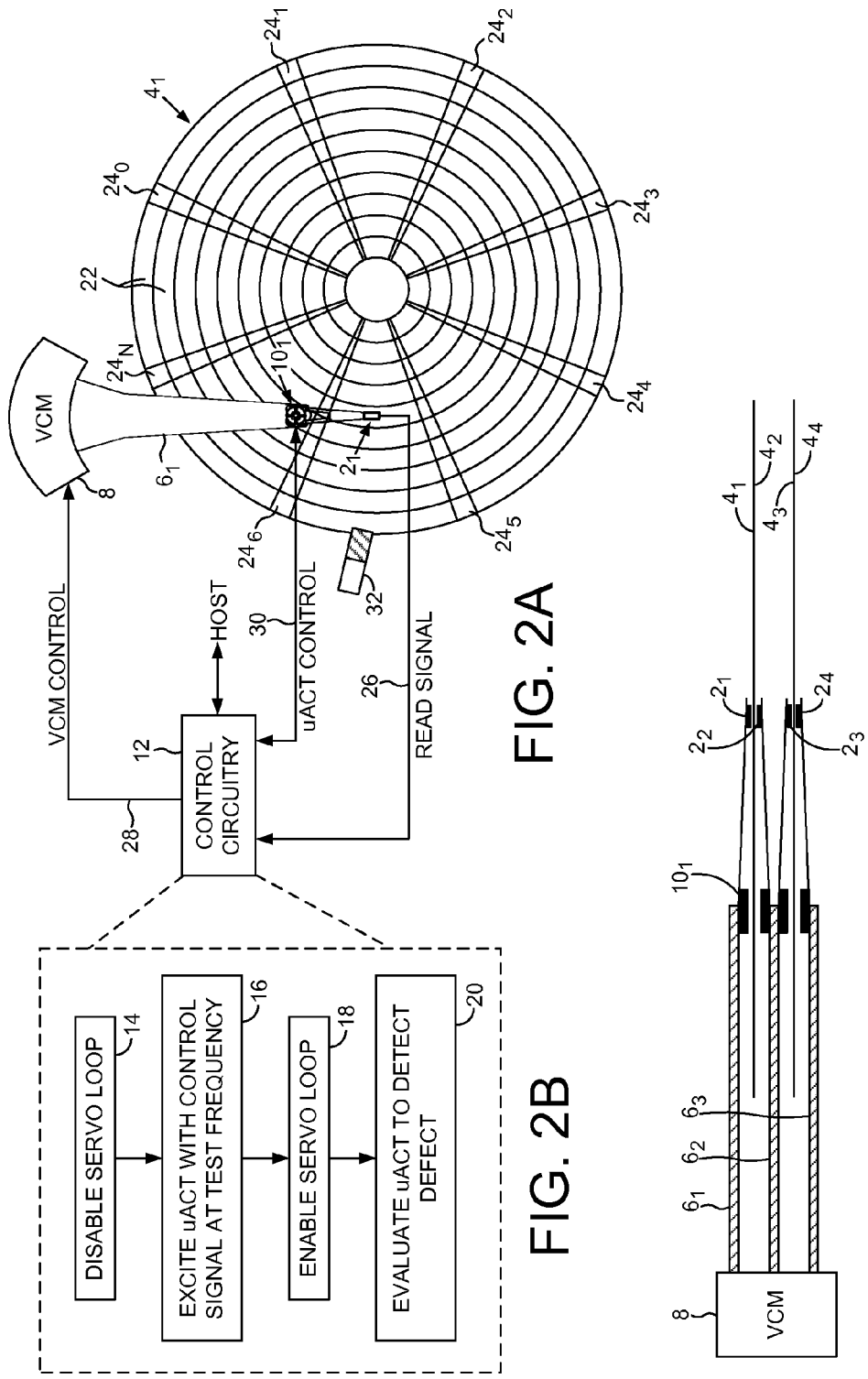

DISK DRIVE DETECTING CRACK IN MICROACTUATOR

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

FIG. 1 shows a prior art disk format 1 as comprising a number of servo tracks 3 defined by servo sectors $5_0\text{-}5_N$ recorded around the circumference of each servo track. Each servo sector 5, comprises a preamble 7 for storing a periodic pattern, which allows proper gain adjustment and timing synchronization of the read signal, and a sync mark 9 for storing a special pattern used to symbol synchronize to a servo data field 11. The servo data field 11 stores coarse head positioning information, such as a servo track address, used to position the head over a target data track during a seek operation. Each servo sector 5, further comprises groups of servo bursts 13, which are recorded with precise intervals and offsets relative to the track centerlines. The servo bursts 13 provide fine head position information used for centerline tracking while accessing a data track during write/read operations.

As the density of the data tracks increases, a microactuator may be employed in combination with the VCM to improve the tracking performance of the servo system. Any suitable microactuator may be employed such as a suitable piezoelectric (PZT) actuator. It may be desirable to test the microactuators so that defective microactuators can be replaced or disabled.

BRIEF DESCRIPTION OF THE DRAWINGS

FIG. 2A shows a disk drive according to an embodiment of the present invention comprising a head actuated over a disk surface by a voice coil motor (VCM) and a microactuator.

FIG. 2B is a flow diagram according to an embodiment of the present invention wherein a servo loop is disabled while exciting the microactuator to accentuate a crack in the microactuator.

FIG. 2C shows an embodiment of the present invention wherein the disk drive comprises a plurality of disk surfaces and a plurality of heads actuated by the VCM and respective microactuators.

DETAILED DESCRIPTION OF EMBODIMENTS OF THE INVENTION

Figure 1:
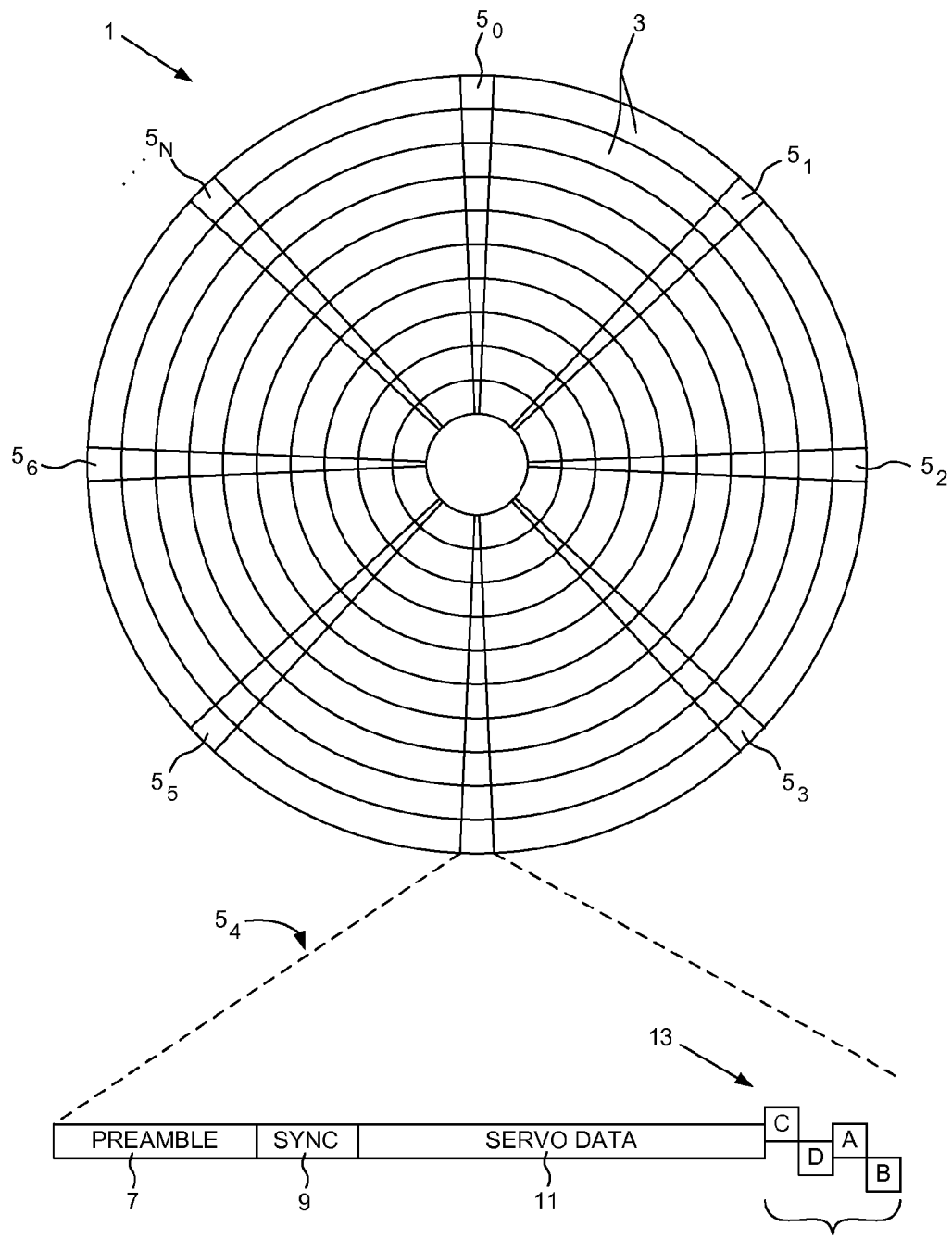
FIG. 1 shows a prior art disk format comprising a plurality of servo sectors that define a plurality of servo tracks.

FIG. 2A shows a disk drive according to an embodiment of the present invention comprising a first disk surface $4_1$, a first head $2_1$ coupled to a distal end of an actuator arm $6_1$, and a voice coil motor (VCM) 8 and a first microactuator $10_1$ operable to actuate the first head $2_1$ over the first disk surface $4_1$. The disk drive further comprises control circuitry 12 for executing the flow diagram of FIG. 2B, wherein a servo loop for servoing the head in response to the servo sectors is disabled (step 14), and after disabling the servo loop, the first microactuator is excited with a control signal at a test frequency in order to accentuate a crack in the first microactuator (step 16). After exciting the first microactuator, the servo loop is enabled (step 18), and after enabling the servo loop, the first microactuator is evaluated to detect the crack in the first microactuator (step 20).

In the embodiment of FIG. 2A, each disk surface (e.g., disk surface $4_1$) comprises a plurality of tracks 22 defined by a plurality of servo sectors $24_1\text{-}24_n$. As the head $2_1$ passes over a servo sector, the control circuitry 12 demodulates the read signal 26 into a position error signal (PES). The PES is filtered by a suitable compensation filter to generate a control signal 28 applied to the VCM 8. The VCM 8 rotates an actuator arm $6_1$ about a pivot in order to position the head $2_1$ radially over the disk $4_1$ in a direction that reduces the PES. The control circuitry 12 may also generate a control signal 30 applied to the microactuator $10_1$ in response to the PES to further increase the bandwidth of the servo system.

Also in the embodiment of FIG. 2A, the disk drive comprises a ramp 32 located at an outer edge of the disk for unloading the actuator arm $6_1$ while the disk drive is idle.

In an embodiment described in greater detail below, the control circuitry 12 may evaluate the microactuator $10_1$ using the ramp 32, for example, by measuring a voltage induced by the microactuator $10_1$ when the load beam $34_1$ is deflected as the actuator arm $6_1$ strikes the ramp 32.

FIG. 2C shows an embodiment of the present invention wherein the VCM 8 rotates a plurality of actuator arms $6_1$-$6_n$ about a pivot in order to coarsely position a plurality of heads $2_1$-$2_n$ over respective disk surfaces $4_1$-$4_n$. A plurality of microactuators $10_1$-$10_n$ are also provided for fine positioning each head, wherein in one embodiment disclosed below, the microactuators $10_1$-$10_n$ are simultaneously excited at the test frequency and then evaluated individually.

Figure 2D:
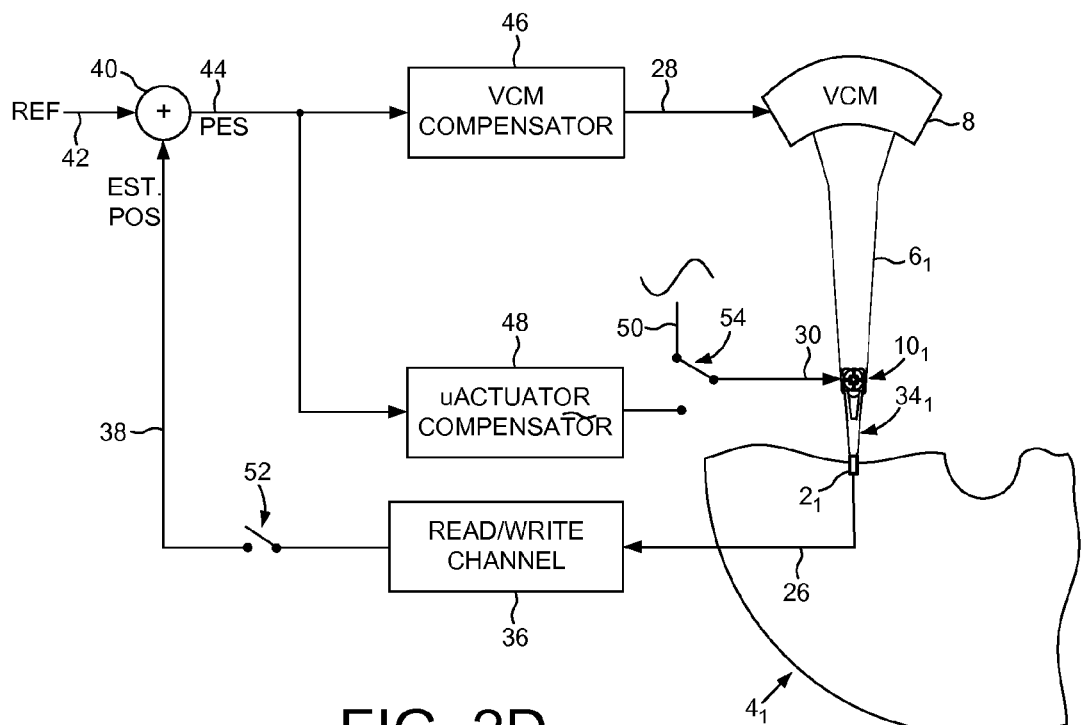
FIG. 2D shows an embodiment of the present invention wherein the servo loop is disabled by disabling a feedback signal while exciting the microactuator.

FIG. 2D shows control circuitry according to an embodiment of the present invention for servoing the head $2_1$ over the disk surface $4_1$ using the VCM 8 and the microactuator $10_1$. During normal operation, a read/write channel 36 processes the read signal 26 to demodulate the servo sectors $24_1$-$24_n$ into an estimated position 38 of the head $2_1$ over the disk surface $4_1$. The estimated position 38 is subtracted 40 from a reference position 42 to generate the PES 44. The PES 44 is processed by a VCM compensator 46 to generate a control signal 28 applied to the VCM 8 and processed by a microactuator compensator 48 to generate a control signal 30 applied to the microactuator $10_1$.

Figure 3:
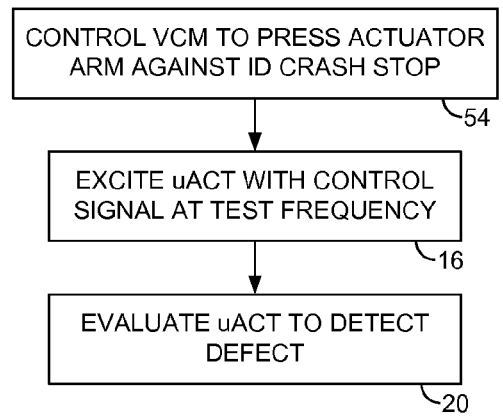
FIG. 3 is a flow diagram according to an embodiment of the present invention wherein an actuator arm is pressed against an inner diameter crash stop while exciting the microactuator.

In one embodiment prior to exciting the microactuator $10_1$ at the test frequency 50 (step 16 of FIG. 2B), the servo loop for servoing the head is disabled by disabling the feedback in FIG. 2D by opening switch 52. The switch 52 in FIG. 2D is illustrative; however, the servo loop may be disabled using any suitable technique. For example, in one embodiment a current value of the PES 44 may be stored in a register and applied as a constant to the VCM compensator 46 while exciting the microactuator $10_1$. In one embodiment, the control circuitry may servo the head over a target radial location (e.g., a middle diameter of the disk) with the servo loop enabled, and then disable the servo loop prior to exciting the microactuator $10_1$. In another embodiment illustrated in the flow diagram of FIG. 3, the control circuitry may servo the head to an inner diameter of the disk and then press the actuator arm against an inner diameter crash stop (step 54) prior to exciting the microactuator $10_1$. This embodiment ensures that data recorded on the disk is not corrupted if the head contacts the disk surface while exciting the microactuator $10_1$.

Figure 4:
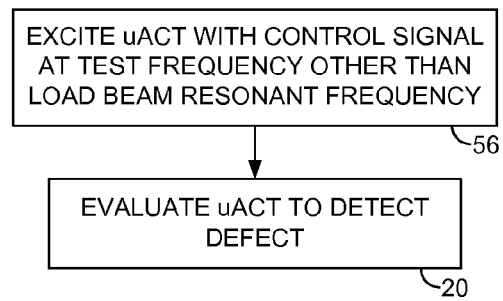
FIG. 4 is a flow diagram according to an embodiment of the present invention wherein the microactuator is excited with a test frequency other than a resonant frequency of a load beam.

In the embodiment of FIG. 2D, a switch 54 conceptually applies the test frequency 50 (a sinusoidal signal) to the microactuator $10_1$ in order to excite the microactuator $10_1$. Any suitable frequency may be selected as the test frequency to excite the microactuator, wherein in an embodiment shown in FIG. 4 the test frequency is substantially different from a resonant frequency of the load beam $34_1$ (step 56) so as not to damage the load beam $34_1$ or the interconnect of the load beam $34_1$ to the actuator arm $6_1$. In one embodiment, an amplitude of the test frequency 50 is substantially higher than an amplitude of the control signal 30 applied during normal operation of the disk drive so as to minimize the time required to accentuate potential cracks in the microactuator $10_1$. Using a higher amplitude control signal to excite the microactuator $10_1$ may induce vibrations that may cause the head to contact the disk surface. However, pressing the actuator arm $6_1$ against the inner diameter crash stop ensures the head cannot corrupt user data recorded on the disk. In another embodiment, the test frequency may excite the microactuator $10_1$ after unloading the actuator arm $6_1$ onto the ramp 32; however, in this embodiment the vibrations of the load beam $34_1$ may result in undesirable wear of the ramp 32.

Figure 2E:
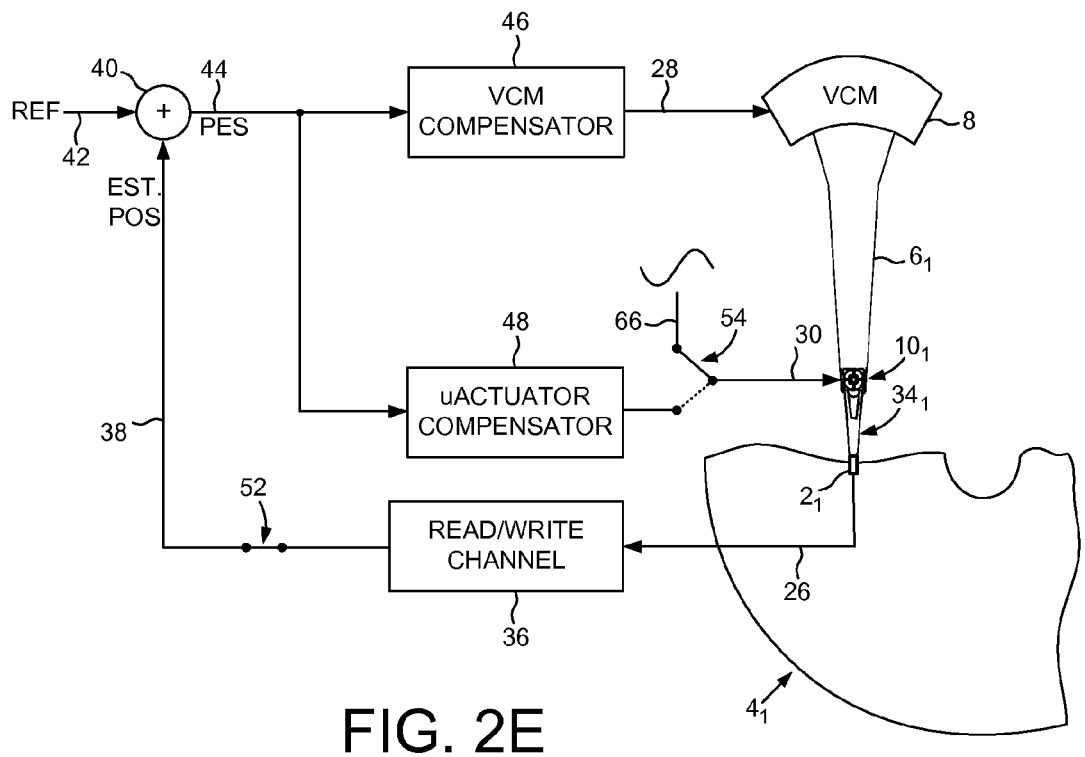
FIG. 2E shows an embodiment of the present invention wherein the feedback signal is enabled to enable the servo loop after exciting the microactuator.
Figure 5A:
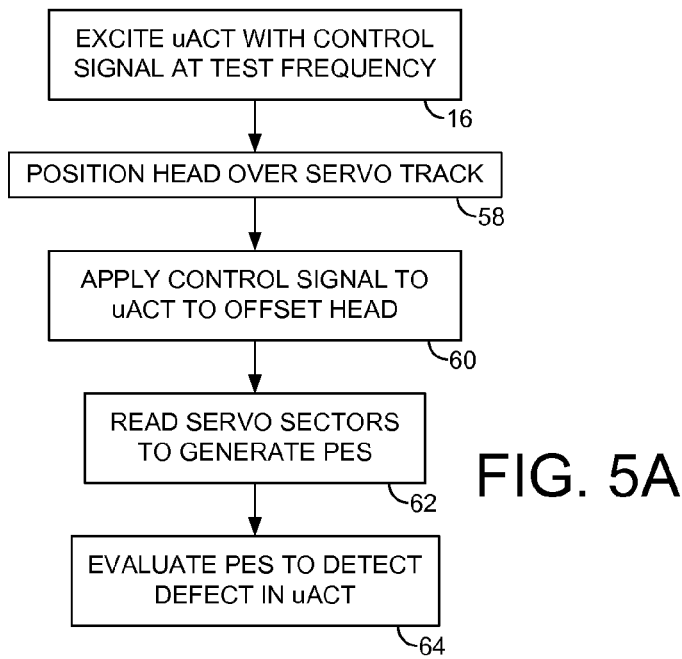
FIG. 5A is a flow diagram according to an embodiment of the present invention wherein after exciting the microactuator, the microactuator is evaluated in response to a position error signal (PES) generated while servoing the head in response to the servo sectors.

After exciting the microactuator $10_1$ at the test frequency, the servo system is enabled (shown in FIG. 2E as closing switch 52) and the microactuator $10_1$ evaluated to detect a crack or other defect in the microactuator $10_1$. Any suitable technique may be employed to evaluate the microactuator $10_1$, wherein in one embodiment shown in the flow diagram of FIG. 5A, the head is positioned over a servo track (step 58) by reading the servo sectors, and then a control signal applied to the microactuator $10_1$ to offset the head (step 60). The servo sectors are read to generate a PES (step 62), and the PES evaluated to detect a crack or other defect in the microactuator (step 64). In an embodiment illustrated in FIG. 2E, a sinusoidal control signal 66 is applied to the microactuator $10_1$ in order to offset the head from the servo track to generate the PES, wherein any suitable frequency of the control signal 66 may be employed. Other embodiments described in greater detail below may evaluate the microactuator $10_1$ with the microactuator servo loop enabled by configuring switch 54 to select the output of the microactuator compensator 48 as the control signal 30 applied to the microactuator $10_1$.

Figure 5B:
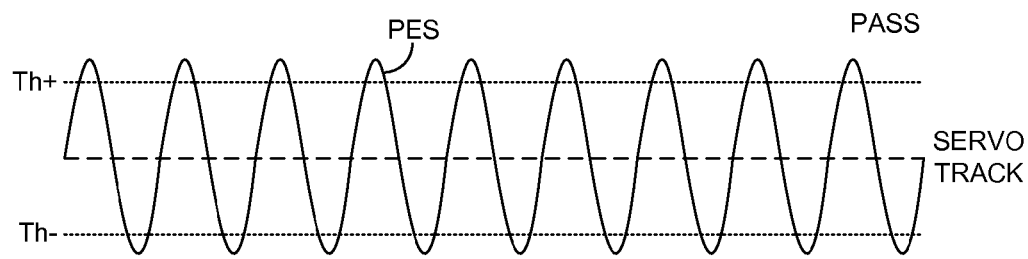
FIG. 5B shows an embodiment of the present invention wherein the PES indicates the microactuator is not defective.
Figure 5C:
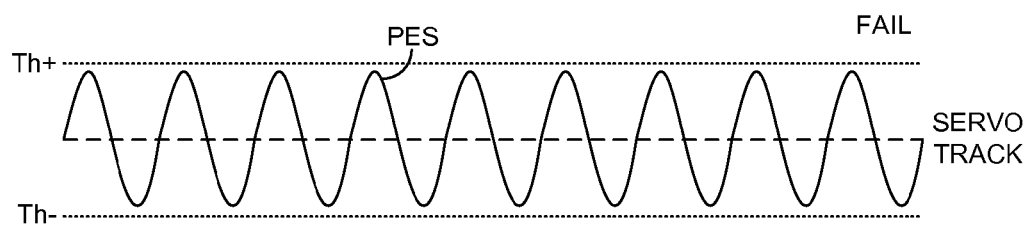
FIGS. 5C-5D show embodiments of the present invention wherein the PES indicates the microactuator is defective.
Figure 5D:
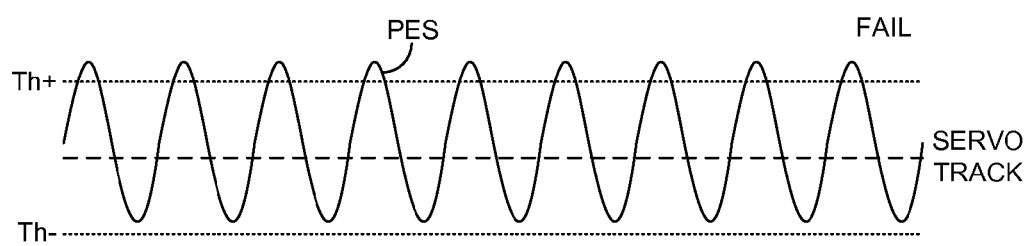

FIG. 5B illustrates a sinusoidal PES as a result of applying the sinusoidal control signal 66 to the microactuator $10_1$. In one embodiment, the PES is compared to thresholds Th+ and Th− representing an offset from each side of the target servo track, wherein the microactuator $10_1$ is considered non-defective if the amplitude of the PES exceeds the thresholds. FIG. 5C shows an example of a defective microactuator $10_1$ wherein the PES falls below both thresholds (both sides of the servo track), and FIG. 5D shows an example of a defective microactuator $10_1$ wherein the PES falls below one of the thresholds (one side of the servo track).

Figure 6A:
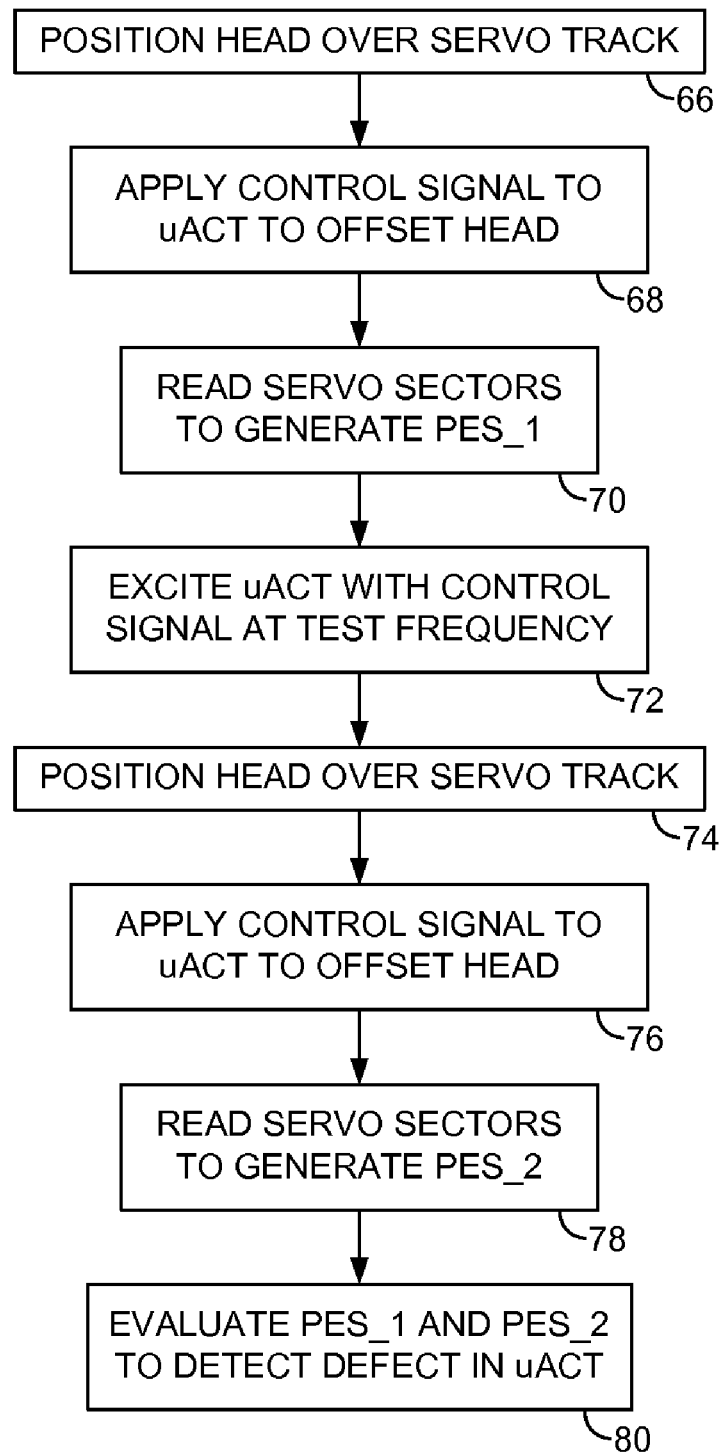
FIG. 6A is a flow diagram according to an embodiment of the present invention wherein a PES level is measured before exciting the microactuator, and after exciting the microactuator, wherein a difference between the PES measurements is used to evaluate the microactuator.
Figure 6B:
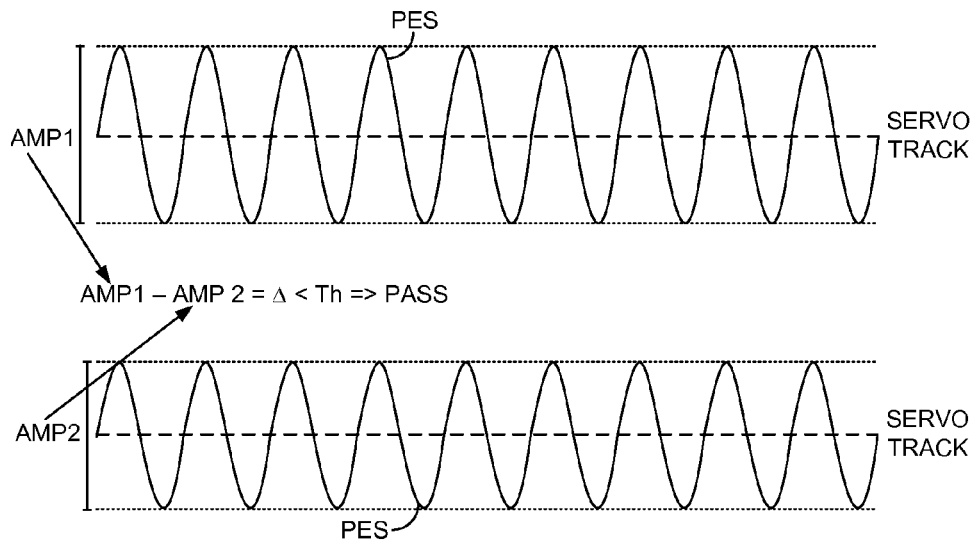
FIG. 6B shows an embodiment of the present invention wherein the difference between the PES measurements indicates the microactuator is not defective.
Figure 6C:
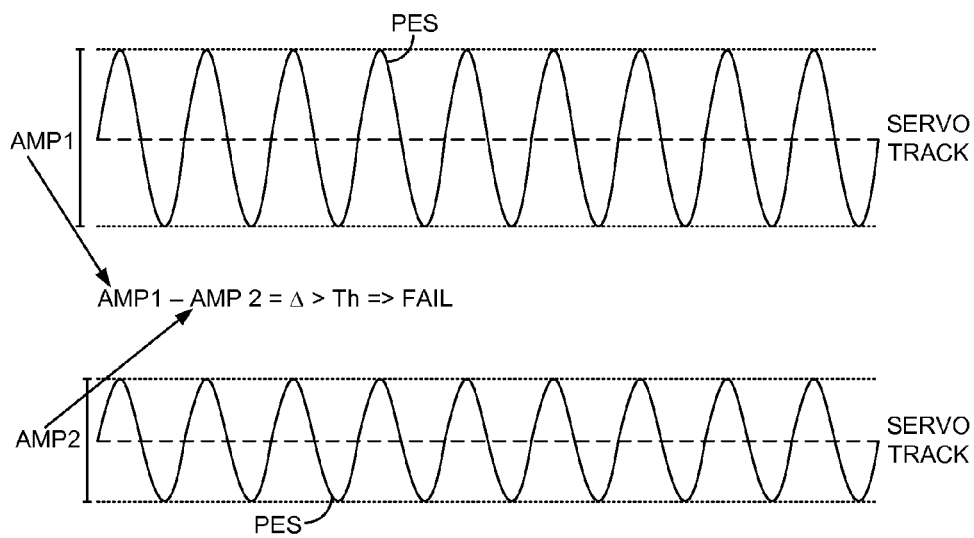
FIG. 6C shows an embodiment of the present invention wherein the difference between the PES measurements indicates the microactuator is defective.

FIG. 6A is a flow diagram according to an embodiment of the present invention for evaluating the microactuator $10_1$, wherein the head is positioned over a servo track (step 66) by reading the servo sectors, the head offset from the servo track by applying a control signal to the microactuator (step 68), and the servo sectors read to generate a first PES (step 70). The microactuator is then excited at the test frequency to accentuate cracks (step 72). After exciting the microactuator, the head is repositioned over the servo track (step 74), the head offset from the servo track by applying a control signal to the microactuator (step 76), and the servo sectors read to generate a second PES (step 78). The microactuator is then evaluated by comparing the second PES to the first PES (step 80). This embodiment is illustrated in FIGS. 6B and 6C wherein if the difference between the first and second PES is greater than a threshold, the microactuator is considered defective. Accordingly, in this embodiment the microactuator is evaluated relative to a change in performance after exciting the microactuator as opposed to evaluating the absolute performance relative to an expected level.

Figure 6D:
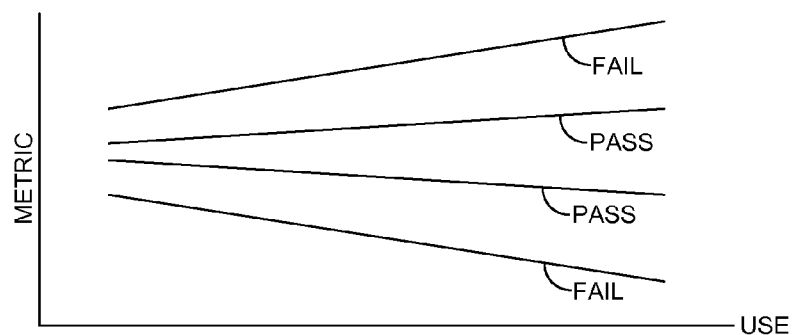
FIG. 6D shows an embodiment of the present invention wherein a slope of a metric is used to evaluate the microactuator.

FIG. 6D illustrates an embodiment of the present invention wherein a rate of change of a metric (e.g., absolute measurement or difference measurement) is evaluated to determine whether the microactuator $10_1$ is defective. For example, the microactuator $10_1$ may be considered defective if the slope (positive or negative) of the metric exceeds a threshold. In this embodiment, the microactuator $10_1$ may be excited multiple times and the metric measured after each excitation in order to measure the rate of change of the metric. The rate of change of the metric may be an indication of future failure even if the current value of the metric would otherwise pass the evaluation.

Figure 7:
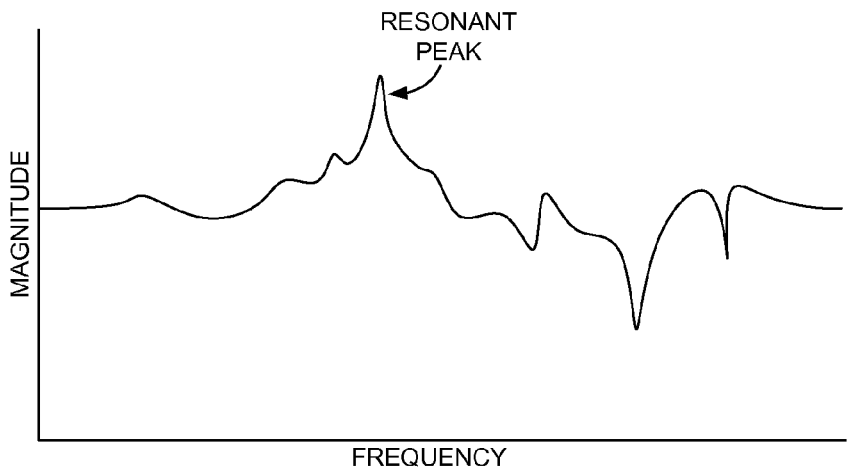
FIG. 7 shows an embodiment of the present invention wherein a frequency response of a microactuator servo loop is used to evaluate the microactuator.

Any suitable metric may be evaluated to determine whether the microactuator is defective. FIG. 7 shows an embodiment of the present invention wherein a frequency response of the microactuator servo loop is evaluated to determine whether the microactuator is defective. In one embodiment, the absolute magnitude of the frequency response may be evaluated, and in another embodiment, a difference between the magnitude before and after exciting the microactuator may be evaluated. The microactuator servo loop may be evaluated open loop or closed loop by appropriately configuring switch 54 of FIG. 2E (where switch 54 represents a concept that may be implemented using any suitable technique). In one embodiment, a resonant peak in the frequency response as shown in FIG. 7 is evaluated in order to evaluate the microactuator. For example, a defect in the microactuator may change the resonant peak amplitude or shift the resonant peak frequency (absolute measurement or difference before and after excitation). Any suitable resonant peak may be evaluated, such as a sway mode resonance of the load beam $34_1$.

Figure 8A:
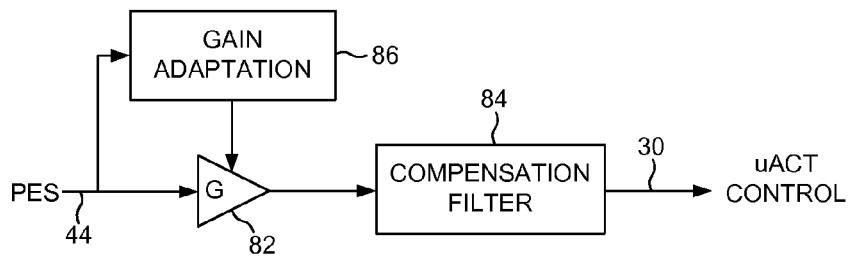
FIG. 8A shows an embodiment of the present invention wherein the microactuator servo loop comprises an adapted gain setting.

FIG. 8A shows control circuitry for implementing the microactuator compensator 48 according to an embodiment wherein a gain 82 of a compensation filter 84 is adapted 86 in response to the PES 44. After exciting the microactuator, the microactuator servo loop is calibrated in order to adapt the gain 82. If there is a crack in the microactuator that reduces its sensitivity, the adjusted gain 82 will change to compensate for the reduced sensitivity. Accordingly, the crack may be detected if the adjusted gain 82 exceeds a threshold.

Figure 8B:
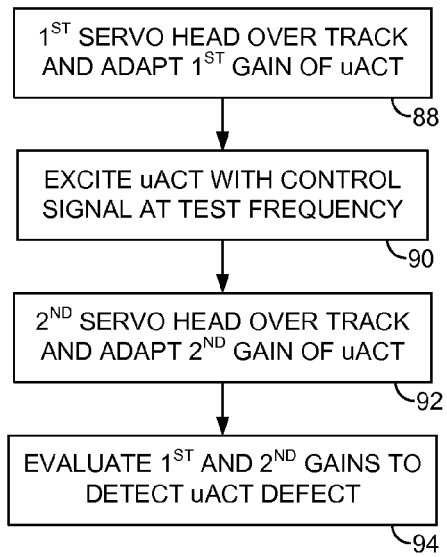
FIG. 8B is a flow diagram according to an embodiment of the present invention wherein after exciting the microactuator the gain of the microactuator servo loop is used to evaluate the microactuator.

FIG. 8B is a flow diagram according to an embodiment of the present invention wherein the head is positioned over a servo track in response to the servo sectors in order to adjust the gain of the microactuator servo loop to a first value (step 88). The microactuator is then excited at the test frequency (step 90) to accentuate cracks or other defects. The head is then repositioned over the servo track and the gain adjusted to a second value (step 92). The difference between the first and second gain values is then evaluated to detect whether the microactuator is defective (step 94). In one embodiment, the flow diagram of FIG. 8B may be executed multiple times in order to develop a rate of change of the gain value as illustrated in FIG. 6D.

Figure 9:
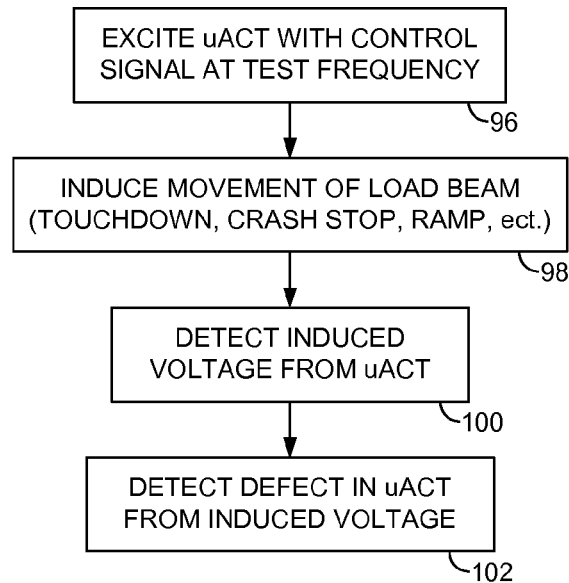
FIG. 9 is a flow diagram according to an embodiment of the present invention wherein after exciting the microactuator an induced movement of the microactuator is used to evaluate the microactuator.

FIG. 9 is a flow diagram according to an embodiment of the present invention wherein after exciting the microactuator at the test frequency (step 96), a movement of the load beam is induced in order to induce a movement in the microactuator (step 98). Any suitable technique may be employed to induce the movement, such as by reducing a fly height of the head until the head contacts the disk (touchdown), or moving the actuator arm until it contacts a crash stop (inner or outer diameter), or until the load beam contacts the ramp. Other embodiments may simply accelerate and/or decelerate the actuator arm using a special calibration seek profile in order to induce movement of the load beam. An induced voltage is detected that is generated by the microactuator due to the induced movement (step 100), and the induced voltage is evaluated to detect a defect in the microactuator (step 102).

Figure 10:
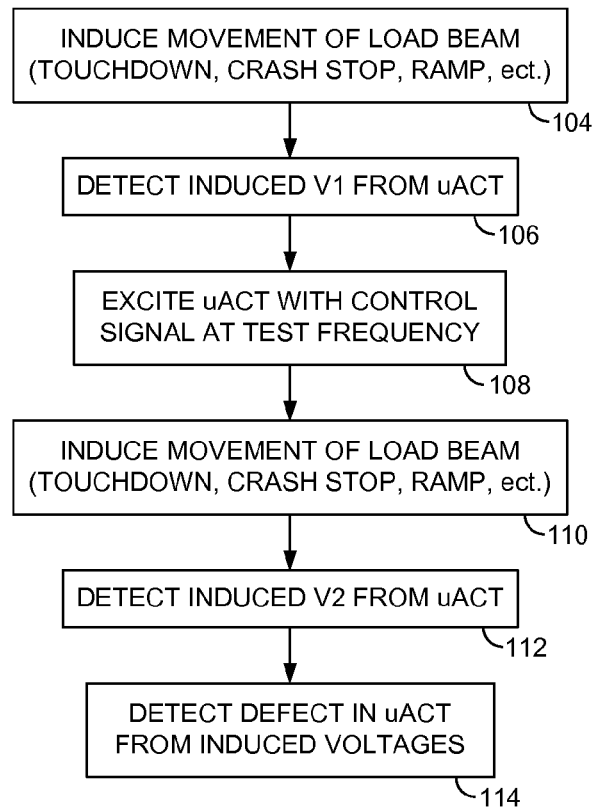
FIG. 10 is a flow diagram according to an embodiment of the present invention wherein a difference between an induced voltage generated by the microactuator before and after exciting the microactuator is used to evaluate the microactuator.

FIG. 10 is a flow diagram according to an embodiment wherein prior to exciting the microactuator at the test frequency, a movement of the load beam is induced in order to induce a movement in the microactuator (step 104). A first induced voltage is detected in response to the induced movement (step 106) and then the microactuator is excited at the test frequency (step 108). A movement of the load beam is again induced in order to induce a movement in the microactuator (step 110), and a second induced voltage is detected in response to the induced movement (step 112). A difference between the first and second induced voltages is evaluated in order to detect a defect in the microactuator (step 114). In one embodiment, the flow diagram of FIG. 10 may be executed multiple times in order to develop a rate of change of the induced voltage as illustrated in FIG. 6D.

Figure 11:
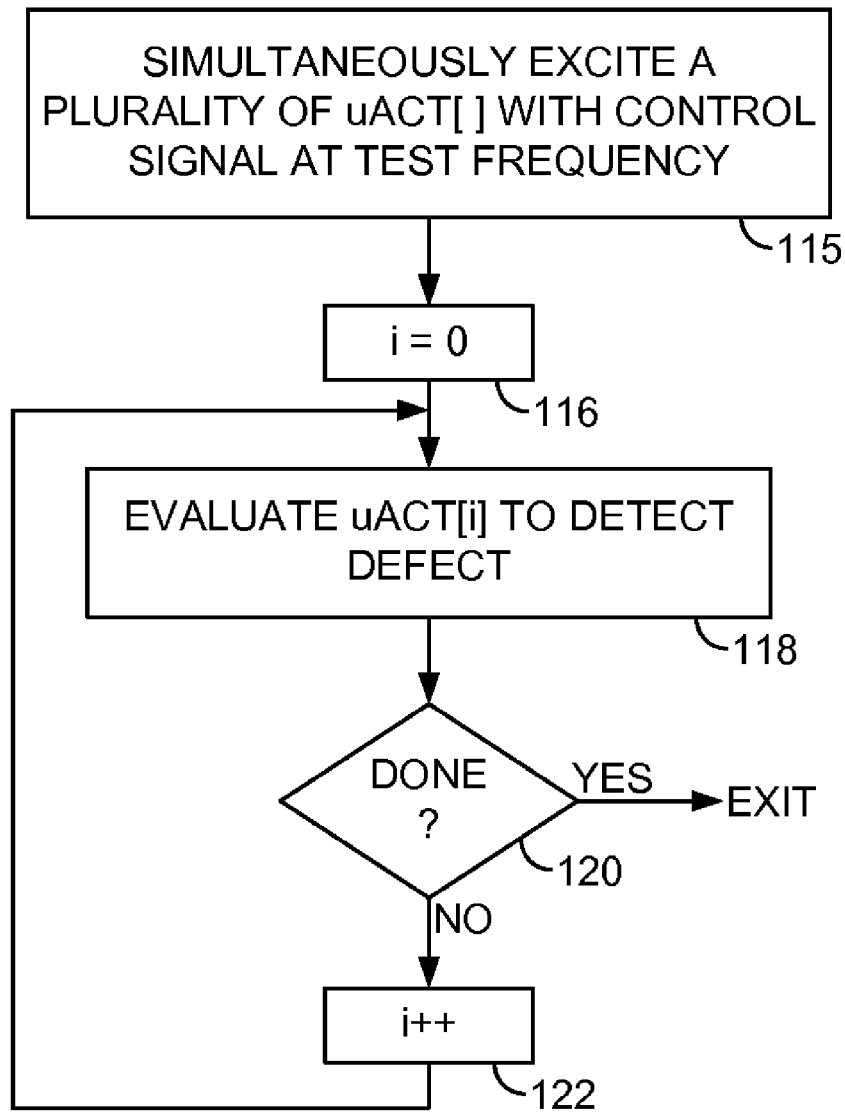
FIG. 11 is a flow diagram according to an embodiment of the present invention wherein a plurality of the microactuators are simultaneously excited and then evaluated individually.

FIG. 11 is a flow diagram according to an embodiment of the present invention wherein a plurality of microactuators $10_1$-$10_n$ are excited simultaneously at the test frequency (step 115). A loop (steps 116, 118, 120, 122) is then executed to evaluate each microactuator individually (e.g., using a technique described above) to determine whether any of the microactuators are defective. In one embodiment, each microactuator $10_1$-$10_n$ may be simultaneously excited by a separate control signal, and in another embodiment, a single control signal may be simultaneously applied to the multiple microactuators (e.g., a wire-ORed control signal).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:
1. A disk drive comprising:
a first disk surface comprising a first plurality of servo sectors;
a first head coupled to a distal end of an actuator arm;
a voice coil motor (VCM) and a first microactuator operable to actuate the first head over the first disk surface; and
control circuitry comprising a servo loop operable to control the VCM and the first microactuator in response to the first plurality of servo sectors, the control circuitry operable to:
disable the servo loop;
after disabling the servo loop, excite the first microactuator with a control signal at a test frequency in order to accentuate a crack in the first microactuator;

after exciting the first microactuator, enable the servo loop; and after enabling the servo loop, evaluate the first microactuator to detect the crack in the first microactuator.

2. The disk drive as recited in claim 1, wherein the control circuitry is further operable to control the VCM to press the actuator arm against an inner diameter crash stop prior to exciting the first microactuator.

3. The disk drive as recited in claim 1, wherein:
the first head is coupled to a distal end of a load beam;
a base of the load beam is connected to an actuator arm;
the first microactuator actuates the load beam;
the load beam comprises a resonant frequency; and
the test frequency is substantially different from the resonant frequency of the load beam.

4. The disk drive as recited in claim 1, wherein the control circuitry is further operable to evaluate the first microactuator to detect the crack in the first microactuator by:
controlling the VCM to position the first head over a servo track on the disk and controlling the first microactuator to offset the first head from the servo track;
reading a servo sector in the servo track to generate a position error signal (PES) representing a position of the first head relative to the servo track; and
detecting the crack in the first microactuator in response to the PES.

5. The disk drive as recited in claim 4, wherein the control circuitry is further operable to evaluate the first microactuator to detect the crack in the first microactuator by evaluating an amplitude of the PES.

6. The disk drive as recited in claim 1, wherein the control circuitry is further operable to evaluate the first microactuator to detect the crack in the first microactuator by evaluating a frequency response of a microactuator servo loop.

7. The disk drive as recited in claim 6, wherein the control circuitry is further operable to evaluate the first microactuator to detect the crack in the first microactuator by evaluating a resonant peak in the frequency response.

8. The disk drive as recited in claim 1, wherein the control circuitry is further operable to evaluate the first microactuator to detect the crack in the first microactuator by:
inducing a movement in the first microactuator;
detecting an induced voltage generated by the first microactuator; and
detecting the crack in the first microactuator in response to the induced voltage.

9. The disk drive as recited in claim 8, wherein the control circuitry is further operable to induce the movement in the first microactuator by reducing a fly height of the first head until the first head contacts the first disk surface.

10. The disk drive as recited in claim 8, wherein the control circuitry is further operable to induce the movement in the first microactuator by controlling the VCM to move the first head.

11. The disk drive as recited in claim 10, wherein the control circuitry is further operable to induce the movement in the first microactuator by controlling the VCM to move the first head until the first head contacts a ramp located at an outer edge of the disk.

12. The disk drive as recited in claim 1, wherein the disk drive further comprises a second disk surface comprising a second plurality of servo sectors and a second head actuated over the second disk surface by the VCM and a second microactuator, the servo loop is operable to control the second microactuator in response to the second plurality of servo sectors, and the control circuitry is further operable to:

after disabling the servo loop, simultaneously excite the first and second microactuators with the control signal at the test frequency; and
after enabling the servo loop, evaluate the first and second microactuators to detect a crack in at least one of the first and second microactuators.

13. A method of operating a disk drive, the disk drive comprising a first disk surface comprising a first plurality of servo sectors, a first head coupled to a distal end of an actuator arm, a voice coil motor (VCM) and a first microactuator operable to actuate the first head over the first disk surface, and a servo loop operable to control the VCM and the first microactuator in response to the first plurality of servo sectors, the method comprising:
disabling the servo loop;
after disabling the servo loop, exciting the first microactuator with a control signal at a test frequency in order to accentuate a crack in the first microactuator;
after exciting the first microactuator, enabling the servo loop; and
after enabling the servo loop, evaluating the first microactuator to detect the crack in the first microactuator.

14. The method as recited in claim 13, further comprising controlling the VCM to press the actuator arm against an inner diameter crash stop prior to exciting the first microactuator.

15. The method as recited in claim 13, wherein:
the first head is coupled to a distal end of a load beam;
a base of the load beam is connected to an actuator arm;
the first microactuator actuates the load beam;
the load beam comprises a resonant frequency; and
the test frequency is substantially different from the resonant frequency of the load beam.

16. The method as recited in claim 13, further comprising evaluating the first microactuator to detect the crack in the first microactuator by:
controlling the VCM to position the first head over a servo track on the disk and controlling the first microactuator to offset the first head from the servo track;
reading a servo sector in the servo track to generate a position error signal (PES) representing a position of the first head relative to the servo track; and
detecting the crack in the first microactuator in response to the PES.

17. The method as recited in claim 16, further comprising evaluating the first microactuator to detect the crack in the first microactuator by evaluating an amplitude of the PES.

18. The method as recited in claim 13, further comprising evaluating the first microactuator to detect the crack in the first microactuator by evaluating a frequency response of a microactuator servo loop.

19. The method as recited in claim 18, further comprising evaluating the first microactuator to detect the crack in the first microactuator by evaluating a resonant peak in the frequency response of the microactuator servo loop.

20. The method as recited in claim 13, further comprising evaluating the first microactuator to detect the crack in the first microactuator by:
inducing a movement in the first microactuator;
detecting an induced voltage generated by the first microactuator; and
detecting the crack in the first microactuator in response to the induced voltage.

21. The method as recited in claim 20, further comprising inducing the movement in the first microactuator by reducing a fly height of the first head until the first head contacts the first disk surface.

22. The method as recited in claim 20, further comprising inducing the movement in the first microactuator by controlling the VCM to move the first head.

23. The method as recited in claim 22, further comprising inducing the movement in the first microactuator by controlling the VCM to move the first head until the first head contacts a ramp located at an outer edge of the disk.

24. The method as recited in claim 13, wherein the disk drive further comprises a second disk surface comprising a second plurality of servo sectors and a second head actuated over the second disk surface by the VCM and a second microactuator, the servo loop is operable to control the second microactuator in response to the second plurality of servo sectors, the method further comprising:
 after disabling the servo loop, simultaneously exciting the first and second microactuators with the control signal at the test frequency; and
 after enabling the servo loop, evaluating the first and second microactuators to detect a crack in at least one of the first and second microactuators.

\* \* \* \* \*